United States Patent [19]

Ohtsuki et al.

[11] Patent Number: 4,845,696
[45] Date of Patent: Jul. 4, 1989

[54] APPARATUS FOR OPTICALLY RECORDING AND REPRODUCING INFORMATION IN RECORD TRACKS ON A ROTATABLE RECORD DISK

[75] Inventors: Tadashi Ohtsuki; Fumiaki Henmi; Yuhei Kobayashi, all of Kanagawa, Japan

[73] Assignee: Sony Corporation, Tokyo, Japan

[21] Appl. No.: 63,526

[22] Filed: Jun. 18, 1987

[30] Foreign Application Priority Data

Jul. 2, 1986 [JP] Japan ................................ 61-155732
Jul. 18, 1986 [JP] Japan ................................ 61-170425

[51] Int. Cl.[4] ........................ G11B 11/14; G11B 13/04
[52] U.S. Cl. .................................... 369/13; 360/114
[58] Field of Search ................. 369/13, 100, 109, 110, 369/112, 116, 54, 58; 360/114, 59, 86; 365/122

[56] References Cited

U.S. PATENT DOCUMENTS

| 4,564,931 | 1/1986 | O'Hara et al. | 369/110 |
|---|---|---|---|
| 4,566,088 | 1/1986 | Yoshida et al. | 369/116 |
| 4,611,317 | 9/1986 | Takeuchi et al. | |
| 4,611,318 | 9/1986 | Winslow | 369/58 |
| 4,638,472 | 1/1987 | Ogata et al. | 369/54 |
| 4,680,594 | 7/1987 | Bracht | 369/54 |
| 4,730,899 | 3/1988 | Kime et al. | 369/112 |

FOREIGN PATENT DOCUMENTS

| 3346114 | 7/1984 | Fed. Rep. of Germany. | |
|---|---|---|---|
| 3500325 | 7/1985 | Fed. Rep. of Germany | 360/114 |
| 60-145534 | 8/1985 | Japan | 369/13 |
| 60-43227 | 3/1986 | Japan | 369/100 |
| 61-92460 | 5/1986 | Japan | 369/100 |
| 61-107551 | 5/1986 | Japan | 360/114 |
| 2139784 | 11/1984 | United Kingdom. | |

Primary Examiner—Aristotelis M. Psitos
Assistant Examiner—Hoa T. Nguyen
Attorney, Agent, or Firm—Lewis H. Eslinger; Jay H. Maioli; Donald S. Dowden

[57] ABSTRACT

Apparatus for recording and reproducing information in record tracks on a rotatable record disc comprises a disc driving portion for rotating the rotatable record disc about an axis of rotation, a pair of optical heads each facing the rotatable record disc and respectively positioned on opposite sides of the axis of rotation, and a head driving portion for moving the optical heads simultaneously towards or away from each other in a radial direction on the rotatable record disc. Each optical head generates a first light beam used selectively for erasing and writing an information signal in the record track and a second light beam used for reading an information signal from the record track and causes the first and second light beams to impinge upon the record track on the rotatable record disc in such a manner that the first light beam precedes the second light beam in a direction along the record track.

13 Claims, 6 Drawing Sheets

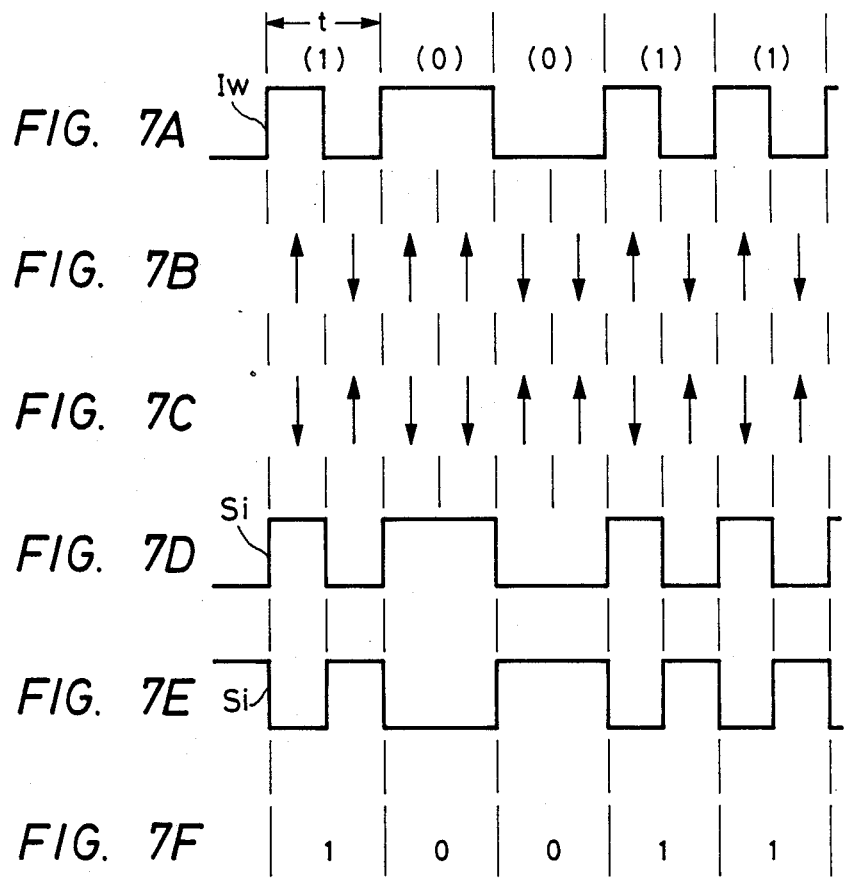

APPARATUS FOR OPTICALLY RECORDING AND REPRODUCING INFORMATION IN RECORD TRACKS ON A ROTATABLE RECORD DISK

BACKGROUND OF THE INVENTION

1. Field of the Invention

The present invention relates generally to apparatus for optically recording and reproducing information in record tracks on a rotatable record disc and, more particularly, to an improved apparatus for recording and reproducing information in cooperation with a rotatable record disc which is available for optically erasing or writing an information signal in record tracks provided thereon and for optically reading an information signal written in the record tracks provided thereon.

2. Description of the Prior Art

There has been proposed a so-called optical writable disc as one type of record disc which is available for optically writing an information signal in record tracks provided thereon and optically reading an information signal written in the record tracks provided thereon. A magnetooptic disc is one of such optical writable discs, is distinguished in that erasure of information signals and writing of information signals are able to be conducted repeatedly thereon. The magnetooptic disc comprises a disc shaped base, a vertically magnetized layer provided on a surface of the disc shaped base, and a protective layer formed to cover the vertically magnetized layer. Recording of information on the magnetooptic disc is achieved by erasing an information signal written thereon and writing a new information signal thereon, and reproduction of information from the magnetooptic disc is achieved by reading an information signal written thereon.

In the event of the erasure of information signals or the writing of information signals, the magnetooptic disc is rotated at a predetermined speed on a rotation axis at the center thereof and a laser light beam is caused to be incident upon the vertically magnetized layer of the magnetooptic disc on which a predetermined external magnetic field acts, so that portions of the vertically magnetized layer on which the laser light beam impinges are subject to an increase in temperature and provided with a direction of magnetization in accordance with the external magnetic field acting thereon. When an information signal is erased from the magnetooptic disc, the vertically magnetized layer of the magnetooptic disc is provided with a uniform direction of magnetization by the impingement of the laser light beam, and when an information signal is written on the magnetooptic disc, the vertically magnetized layer of the magnetooptic disc is provided with inversions in the direction of magnetization in a predetermined pattern as a result of the impingement of the laser light beam.

Further, in the event of the reading of information signals, another laser light beam having power smaller than that of the laser light beam used for the erasure or writing of information signals is caused to be incident upon the vertically magnetized layer of the magnetooptic disc which is rotated and a reflected laser light beam from the vertically magnetized layer of the magnetooptic disc is detected by a photosensitive device, so that a reproduced information signal corresponding to the information signal written in the magnetooptic disc is obtained from the photosensitive device. The reflected laser light beam obtained from the vertically magnetized layer of the magnetooptic disc in the case of the reading of information signals is provided, in accordance with the Kerr effect, with rotations of a polarization plane thereof in response to inversions in the direction of magnetization made in the vertically magnetized layer to represent the information signals written therein. Such rotations of the polarization plane of the reflected laser light beam are detected by the photosensitive device by means of detecting each of orthogonal polarized components of the reflected laser light beam separately and comparing detection outputs of the orthogonal polarized components with each other to produce a comparison output. Then, the reproduced information signal is obtained based on the comparison output.

In the magnetooptic disc on which the erasure, writing and reading of information signals are effected as mentioned above, a plurality of circular record tracks are formed coaxially in the vertically magnetized layer to surround a central portion thereof. Each record track is partitioned into a plurality of sectors and scanned by the laser light beam when the magnetooptic disc is rotated at the predetermined speed, so that the recording of information or the reproduction of information is carried out in units of one track or one sector.

Accordingly, a recording and reproducing apparatus for recording information on the magnetooptic disc and reproducing information from the magnetooptic disc comprises a disc driving portion for rotating the magnetooptic disc, a magnetic field generating portion for producing a predetermined magnetic field acting upon the magnetooptic disc, an optical head portion located to face the magnetooptic disc loaded on the disc driving portion for generating a laser light beam and causing the same to be incident upon the record track formed in the vertically magnetized layer of the magnetooptic disc, and a photodetecting portion for detecting a reflected laser light beam from the record track formed in the vertically magnetized layer of the magnetooptic disc to produce a reproduced information signal.

In a previously proposed apparatus for recording information on the magnetooptic disc and reproducing information from the magnetooptic disc, an optical head device for causing a single laser light beam to be incident upon the record track formed in the vertically magnetized layer of the magnetooptic disc is employed and the single laser light beam emitted from the optical head device is used for both the erasure or writing of information signals and the reading of information signals, selectively. In order to achieve such alternative use of the single laser light beam, a power control for the optical head device is carried out in such a manner that the laser light beam is emitted form the optical head device with relatively large power to be used for erasing information signals or writing information signals in the record track and with relatively small power to be used for reading information signals from the record track, and a switching control for the magnetic field generating portion is also carried out for causing the magnetic field produced by the magnetic field generating portion to have opposite directions for use in the writing or erasure of information signals and in the reading information signals, respectively.

However, in the previously proposed apparatus in which the single laser light beam emitted from the single optical head device is used for both the writing or erasure of information signals in the vertically magnetized layer of the magnetooptic disc and the reading of information signals from the vertically magnetized layer of the magnetooptic disc, selectively, there is a problem that a dead time is wasted to wait for completion of each turn of the magnetooptic disc when information signals are written in a selected position on the magnetooptic disc and therefore it is difficult to increase recording speed on the magnetooptic disc. For example, when an information signal written in a selected sector contained in a certain one of the record tracks which are formed in the vertically magnetized layer of the magnetooptic disc is erased and then a new information signal is written in the selected sector and thereafter read from the selected sector to be verified, first, the laser light beam emitted from the optical head device to be incident upon the vertically magnetized layer of the magnetooptic disc is provided with power for reading and subjected to a positional control so as to impinge upon the selected sector under a situation wherein address data recorded in the sectors in each record track are read by the laser light beam. Then, the laser light beam impinging upon the selected sector is changed to be provided with power for recording or erasing, so that the information signal written in the selected sector is erased. After that, the new information signal is written in the selected sector when one turn of the magnetooptic disc is completed after the start of the erasure of the information signal from the selected section. On the occasion of writing the new information signal the magnetic field procuded by the magnetic field generating portion is switched to have an inverted direction. Further, when another turn of the magnetooptic disc is completed after the start of the writing of the new information signal in the selected section, the laser light beam impinging upon the selected section is changed again to be provided with the power for reading and the new information signal which has been written in the selected sector is read to be verified by the laser light beam.

Accordingly, after the laser light beam emitted from the optical head device to be incident upon the vertically magnetized layer of the magnetooptic disc is caused to impinge upon the selected sector, three turns of the magnetooptic disc are required for erasure the information signal from the selected section, writing the new information signal in the selected section, and reading the new information signal from the selected section for verification, respectively, and in a period of each turn of the magnetooptic disc, a dead time is caused after the selected section is scanned by the laser light beam. Consequently, high speed recording of information signals on the magnetooptic disc is prevented from being realized.

Further, in the previously proposed apparatus mentioned above, it is required to control the magnetic field produced by the magnetic field generating portion to have opposite directions for use in the writing of information signals and in the reading of information signals, respectively. Accordingly, the magnetic field generating portion may be composed of a permanent magnet and a magnet inverting device for inverting the permanent magnet mechanically or an electromagnet and a magnet inverting circuit device for inverting the direction of an exciting current supplied to the electromagnet, and therefore, is undesirably complicated in construction. Besides, the inversion of the direction of the magnetic field by means of the magnet inverting device or the magnet inverting circuit device is not conducted at high speed usually, and this is a further impediment to the high speed recording of information signals on the magnetooptic disc.

When the writing of information signals is carried out in units of one sector on the magnetooptic disc by the apparatus for recording and reproducing information, it is usual that the information signal is written in each sector in the form of digital data. In such case, it is possible that the digital data written in the sector will contain errors which can not be corrected by error correction performed when the digital data are read from the magnetooptic disc and as a result proper reproduced information signals are not obtained. Accordingly, it has been proposed to provide alternate sectors which are distinct from sectors in which the digital data are normally written, that is, so-called user's sectors, at predetermined positions on the magnetooptic disc and used for rewriting of digital data which are written in the user's sector with errors unable to be corrected by the error correction.

In writing digital data in units of one sector on the magnetooptic disc which is provided with the alternate sectors, the digital data are written in the user's sector and then read from the user's sector for verification. In the case where the verification indicates that proper reproduced information signals can not be obtained from the digital data written in the user's sector, the same digital data are rewritten in the alternate sector and the digital data rewritten in the alternate sector is read in place of the digital data written in the user's sector on the occasion of the reproduction of information, so that alternation of sectors is effected.

However, when digital data are written in units of one sector in the magnetooptic disc provided with the alternate sectors by the apparatus aforementioned a relatively long time is required, after writing the digital data in the user's sector, for verifying the digital data written in the user's sector, causing the laser light beam to reach the alternate sector, and rewriting the digital data in the alternate sector, and accordingly data transfer speed is substantially reduced.

OBJECTS AND SUMMARY OF THE INVENTION

Accordingly, it is an object of the present invention to provide an apparatus for optically recording and reproducing information in record tracks on a rotatable record disc, which avoids the aforementioned problems encountered with the prior art.

Another object of the present invention is to provide an apparatus for optically recording and reproducing information in record tracks on a rotatable record disc, by which a light beam is caused to impinge upon the rotatable record disc, so that erasure of information signals in a selected portion of the record tracks on the rotatable record disc, writing of information signals in the selected portion of the record tracks, and verifying of the information signals written in the selected portion of the record tracks are carried out at relatively high speed with excellent reliability.

A further object of the present invention is to provide an apparatus for optically recording and reproducing information in record tracks on a rotatable record disc, by which a light beam is caused to impinge upon the rotatable record disc, so that erasure of information signals in a selected portion of the record tracks on rotatable record disc, writing of information signals in the selected portion of the record tracks, and verifying of the information signals written in the selected portion of the record tracks are completed within one turn of the rotatable record disc after the light beam reaches the selected portion of the record tracks.

A still further object of the present invention is to provide an apparatus for optically recording and reproducing information in record tracks on a rotatable record disc, in which alternation of sectors wherein an information signal is written in at least one sector contained in one of the record tracks and read from the sector for verification, and then the information signal is rewritten in at least one alternate sector contained in the record track as occasion demands in accordance with a result of the verification, is carried out without reducing substantially the data transfer speed when the information signals are written in units of one sector in the record track, so that the information signals are written in each sector rapidly in such a manner that proper reproduced information signals are reliably obtained therefrom.

According to the present invention, there is provided an apparatus for recording and reproducing information in record tracks on a rotatable record disc, which comprises a disc driving portion for rotating the rotatable record disc loaded thereon, a pair of optical head devices each facing the rotatable record disc and positioned on opposite sides of the axis of the rotation of the rotatable record disc, each of which generates a first light beam used selectively for erasing and writing an information signal in the record track and a second light beam used for reading an information signal from the record track and causes the first and second light beams to impinge upon the record track on the rotatable record disc rotated by the disc driving portion in such a manner that the first light beam precedes the second light beam in a direction along the record track, and a head driving portion for moving the optical head devices simultaneously toward or away from each other in a which is radial with respect to the rotatable record disc.

In a preferred embodiment of apparatus according to the present invention, a light beam control portion is also provided for causing the first light beam to write the information signal in sectors each forming a portion of the record track and causing the second light beam to read the information signal written in the sectors, and an operation control block is further provided for controlling the operation of the optical head portions and the operation of the light beam control portion. The operation control block is operative to control the optical head portions and the light beam control portion to cause the first light beam to write the information signal in at least one selected sector and to cause the second light beam to read the information signal written in the selected sector, to check whether or not the information signal is properly written in the selected sector based on the information signals read by the second light beam, and to control further the optical head portions and the light beam control portion to cause the first light beam to rewrite the same information signal as that written in the selected sector in at least one alternate sector which is provided at a predetermined location on the record track containing the selected sector when the check reveals results in that the information signal is not properly written in the selected sector.

In the apparatus thus constituted in accordance with the present invention, each of the optical head devices is arranged to cause the first and second light beams emitted therefrom to impinge upon a common record track on the rotatable record disc rotated by the disc driving portion at a predetermined speed, and either of a first operating state wherein the first and second light beams emitted from one of the optical head devices are incident upon the record track so that the first light beam precedes the second light beam in the direction along the circular track and a second operating state wherein the first and second light beams emitted from the other of the optical head devices are incident upon the circular track so that the first light beam precedes the second light beam in the direction along the record track, is selected.

In recording information in a specified portion of a selected record track on the rotatable record disc rotated at the predetermined speed i.e., in successively erasing information signals written in the specified portion, writing new information signals in the specified portion, and verifying the new information signals, first, the second light beam emitted from one of the optical head devices is caused to reach the specified portion under a situation wherein address data recorded in each record track are read by both the second light beams emitted from the optical head devices, or the second light beam emitted from a predetermined one of the optical head devices is caused to reach the specified portion under a situation wherein address data recorded in each record track are read by the second light beams emitted from the predetermined one of the optical head devices. Next, the information signal written previously in the specified portion is erased by the first light beam emitted from the optical head device of which the second light beam has reached the specified portion. Then, when a half turn of the rotatable record disc is completed so that the first and second light beam emitted from the other of the optical head device are caused to reach the specific portion, and new information signal is written in the specific portion by the first light beam emitted from the other of the optical head devices. Immediately after the writing of new information signals, the new information signal written in the specified portion is read by the second light beam emitted from the other of the optical head device so as to be verified. As described above, the erasure of information signals written previously in the specified portion, the writing of new information signals in the specified portion, and the verification of the new information signals written in the specified portion are completed within one turn of the rotatable record disc, and therefore the recording of information in the specified portion of the selected record track on the rotatable record disc is carried out at a relatively high speed.

In the case where a magnetooptic disc is used as the rotatable record disc, a pair of magnetic field generating portions each extending along moving paths of the optical head devices in the radical direction on the magnetooptic disc are provided. In such a case, with the magnetic field generating portions arranged to produce respective magnetic fields acting upon the magnetooptic disc in opposite directions, the writing the information signal on the magnetooptic disc is conducted with the magnetic field from one of the magnetic field generating portions and the erasure of information signals written on the magnetooptic disc is conducted with the magnetic field from the other of the magnetic field generating portions, so that each of the magnetic fields produced by the magnetic field generating portions can be fixed in its direction. Accordingly, each of the magnetic field generating portions is not required to have a magnet inverting device for inverting a permanent magnet mechanically or a magnet inverting circuit device for inverting the direction of an exciting current supplied to an electromagnet. This simplifies the construction of the magnetic field generating portion and avoids the problem that inversion of the direction of the magnetic field hinders high the speed recording of information signals on the magnetooptic disc.

With the preferred embodiment, writing of information signals in each sector contained in the record track on the rotatable record disc and reading of information signals written in the sector are performed with alternation of sectors. In the writing of information signals in the sector with the alternation of sectors, under the control of the operation control block, an information signal is written in at least one selected sector by the first light beam emitted from the optical head device and the information signal written in the selected sector is read by the second light beam emitted from the optical head device. The second light beam by which the information signal is read from the selected sector is detected for producing a reproduced information signal. Then, it is checked by the operation control block whether or not the information signal is properly written in the selected sector in accordance with the reproduced information signals. As a result of the check, if it is determined that the information signal is not properly written in the selected sector, the same information signal as that written in the selected sector is rewritten by the first light beam emitted from the optical head device in at least one alternate sector which is provided at a predetermined position on the record track containing the selected sector, under the control of the operation control clock.

Accordingly, the alternation of, sectors is performed without reducing substantially the data transfer speed when the information signals are written in units of one sector in the record track, so that the information signal is written in each sector rapidly in such a manner that a proper reproduced information signal is reliably obtained therefrom.

The above, and other objects, features and advantages of the present invention will become apparent from the following detailed description which is to be read in conjunction with the accompanying drawings.

BRIEF DESCRIPTION OF THE DRAWINGS

FIGS. 7A to 7F are schematic time charts used for explaining the information recording operation of the embodiment shown in FIG. 1.

DESCRIPTION OF THE PREFERRED EMBODIMENTS

Figure 1:
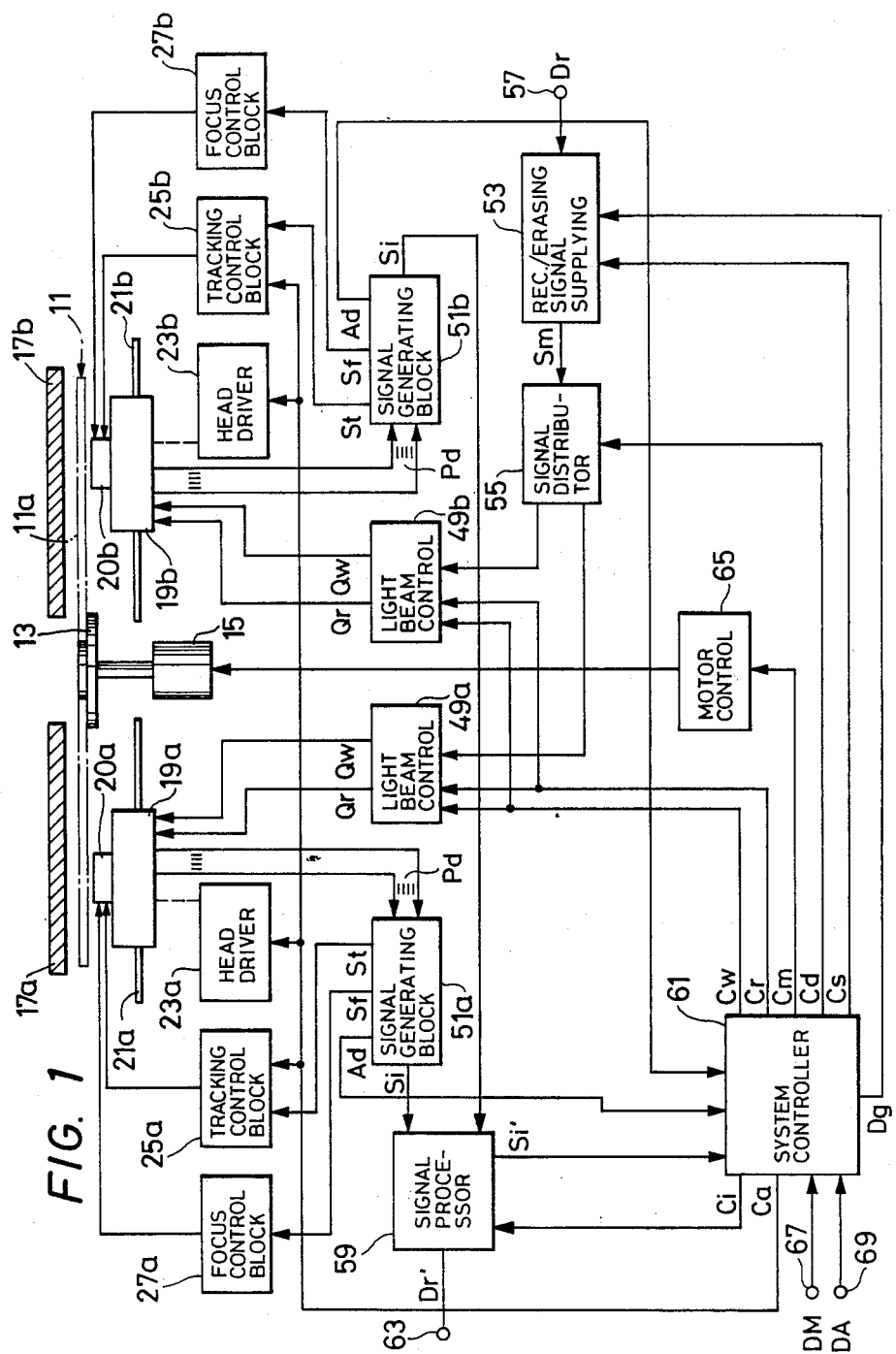
FIG. 1 is a schematic block diagram showing an embodiment of apparatus for optically recording and reproducing information in record tracks on a rotatable record disc according to the present invention.
Figure 2:
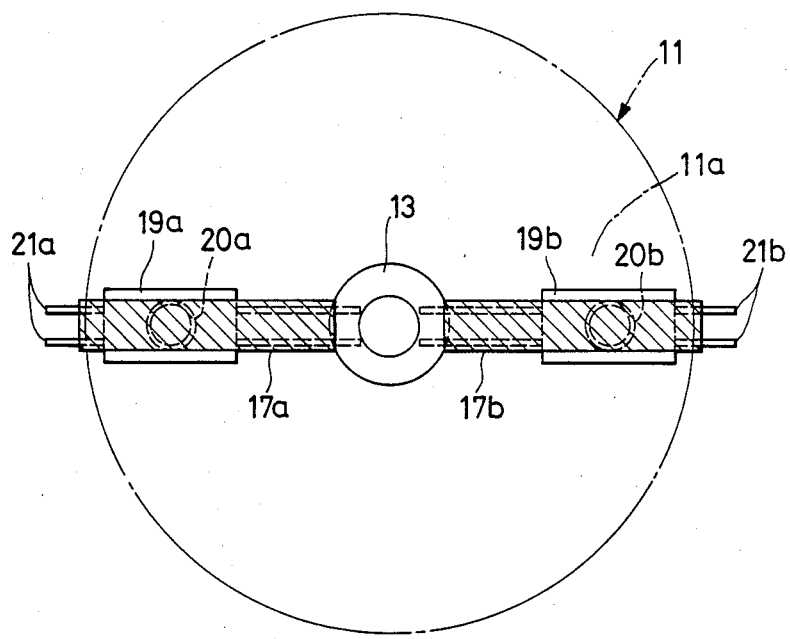
FIG. 2 is a schematic illustration showing a positional relation between optical heads and magnets employed in the embodiment shown in FIG. 1.

FIGS. 1 and 2 shows one embodiment of apparatus for optically recording and reproducing information in record tracks on a rotatable record disc according to the present invention. This embodiment is operative to record and reproduce information in cooperation with a magnetooptic disc which is one of optical writable discs.

Referring to FIGS. 1 and 2, the embodiment is provided a disc driving table 13 which engages with a central portion of a magnetooptic disc 11 to support the magnetooptic disc 11 in its entirety, as indicated by a dot-dash line. The disc driving table 13 is rotatable on its central shaft connected to a motor 15 and turned at a predetermined speed by the motor 15. The disc driving table 13 and motor 15 constitute a disc driving portion for rotating the magnetooptic disc 11 at a predetermined speed. The magnetooptic disc 11 has a vertically magnetized layer forming a record track area 11a, and a plurality of circular record tracks are provided coaxially in the vertically magnetized layer to surround a central portion thereof. Each of the circular record tracks is partitioned into a plurality of sectors.

A pair of magnets 17a and 17b are placed on opposite sides of the axis of rotation of the magnetooptic disc 11 at a location above the magnetooptic disc 11. Each of the magnets 17a and 17b is shaped into a rectangular plate having a predetermined thickness and extending along a radial direction on the magnetooptic disc 11 in parallel with the record track area 11a of the magnetooptic disc 11. The magnet 17a is magnetized in the direction of thickness to have the south pole on the side of its upper surface and the north pole on the side of its under surface, and the magnet 17b is magnetized also in the direction of thickness to have the north pole on the side of its upper surface and the south pole on the side of its under surface.

A pair of optical heads 19a and 19b are disposed under the magnetooptic disc 11 loaded on the disc driving table 13 and respectively face the magnets 17a and 17b. The magnetooptic disc 11 extends between the heads 19a and 19b, which are below the disc 11, and the magnets 17a and 17b. which are above it. The optical heads 19a and 19b are provided with projecting portions 20a and 20b facing the magnetooptic disc 11 and also on opposite sides of the axis of rotation of the magnetooptic disc 11. Each of the optical heads 19a and 19b contains a laser light beam generating portion for emitting a first laser light beam used selectively for erasing and writing an information signal on the magnetooptic disc 11 and a second laser light beam used for reading an information signal written on the magnetooptic disc 11, and a photodetecting portion.

Each of the projecting portions 20a and 20b of the optical heads 19a and 19b contains an objective lens for causing the first and second laser light beams emitted from the laser light beam generating portion to impinge upon the record track area 11a of the magnetooptic disc 11, and for receiving a reflected laser light beam coming from the record track area 11a of the magnetooptic disc 11. The reflected laser light beams received by the objective lenses respectively contained in the projecting portions 20a and 20b are guided to the photodetecting portions contained in the optical heads 19a and 19b, respectively. The optical heads 19a and 19b are supported respectively by guide members 21a and 21b each comprising a bar which is disposed under the magnet 17a or 17b and extends in the radial direction of the magnetooptic disc 11 in parallel with the record track area 11a of, the magnetooptic disc 11 as shown in FIG. 2. The optical heads 19a and 19b are movable in the radial direction on the magnetooptic disc 11 under guidance by the guide members 21a and 21b, respectively. Head drivers 23a and 23b are also provided respectively for moving the optical heads 19a and 19b simultaneously to be close to or distant from each other along the guide members 21a and 21b. The guide members 21a and 21b and the head drivers 23a and 23b inclusive constitute a head driving portion.

A tracking control block 25a and a focus control block 27a are provided for controlling the first and second laser light beams which impinge upon the magnetooptic disc 11 through the objective lens contained in the projecting portion 20a of the optical head 19a to portion and focus their respective beam spots properly on the record tract formed in the record track area 11a of the magnetooptic disc 11. Similarly, a tracking control block 25b and a focus control block 27b are provided for controlling the first and second laser light beams which impinge upon the magnetooptic disc 11 through the objective lens contained in the projecting portion 20b of the optical head 19b to make position and focus their respective beam spots properly on the record track formed in the record track area 11a of the magnetooptic disc 11.

With the operation of each of the head driving portions, the tracking control blocks 25a and 25b and the focus control blocks 27a and 27b, the first and second laser light beams emitted from each of the optical heads 19a and 19b are controlled to impinge in common upon one of the record tracks on the magnetooptic disc 11 and to be focused appropriately on that record track.

Light beam control blocks 49a and 49b and signal generating blocks 51a and 51b are also provided in connection with the optical heads 19a and 19b. The light beam control block 49a supplies a driving signal Qw for controlling the first (writing) laser light beam and a driving signal Qr for controlling the second (reading) laser light beam to the laser light beam generating portion contained in the optical head 19a, and the light beam control block 49b supplies a driving signal Qw for controlling the first(writing) laser light beam and a driving signal Qr for controlling the second (reading) laser light beam to the laser light beam generating portion contained in the optical head 19b. Further, a recording/erasing signal supplying block 53 and a signal distributor 55 are provided in connection with the light beam control blocks 49a and 49b. The recording/erasing signal supplying block 53 supplies a light beam modulating signal Sm which is composed of a data signal corresponding to recording data Dr supplied from a terminal 57, an erasing signal to the signal distributor 55 or some other signals, and the signal distributor 55 is operative to distribute the light beam modulating signal Sm to each of the light beam control blocks 49a and 49b. The driving signal Qw for controlling the first laser light beam, which is supplied to the laser light beam generating portion contained in each of the optical heads 19a and 19b from each of the light beam control blocks 49a and 49b, is produced in response to the light beam modulating signal Sm from the signal distributor 55.

The signal generating block 51a receives a plurality of detection output signals Pd which are obtained from the photodetecting portion contained in the optical head 19a in response to variations in the reflected laser light beam from the record track area 11a of the magnetooptic disc 11 and thereby produces a reproduced information signal Si representing data read from the sectors provided on the magnetooptic disc 11, reproduced address data Ad obtained based on address data recorded in each sector on the magnetooptic disc 11, a tracking error signal St and a focus error signal Sf to be supplied to a signal processor 59, a system controller 61, the tracking control block 25a and the focus control block 27a, respectively. Similarly, the signal generating block 51b receives a plurality of detection output signals Pd which are obtained from the photodetecting portion contained in the optical head 19b in response to variations in the reflected laser light beam from the record track area 11a of the magnetooptic disc 11 and thereby produces a reproduced information signal Si, reproduced address data Ad, a tracking error signal St and a focus error signal Sf to be supplied to the signal processor 59, the system controller 61, the tracking control block 25b and the focus control block 27b, respectively.

The signal processor 59 is operative to produce reproduced data Dr' based on the reproduced information signals Si which are supplied from the signal generating blocks 51a and 51b and deliver the same to an output terminal 63. Further, the signal processor 59 supplies a signal Si' for verification to the system controller 61.

In addition, a motor control portion 65 is provided for controlling the motor 15 to turn at predetermined speed.

The system controller 61 is supplied from a terminal 67 with a first command signal DM for designating selectively a data writing operation mode and a data reading operation mode and from a terminal 69 with a second command signal DA for assigning a position on the record track area 11a of the magnetooptic disc 11 at which writing of data or reading of data is to be conducted, in addition to the reproduced address data Ad from the signal generating blocks 51a and 51b and the signal Si' for verification from the signal processor 59. Under such a condition, the system controller 61 supplies an access control signal Ca for controlling an incident position of each of the first and second laser light beams from the optical heads 19a and 19b on the record track area 11a of the magnetooptic disc 11 to the head drivers 23a and 23b and the tracking control blocks 25a and 25b, a reproduced data control signal Ci for controlling a data reproducing operation for obtaining the reproduced data Dr' based on the reproduced information signals Si from the signal generating blocks 51a and 51b to the signal processor 59, a first light beam control signal Cw for use in generating the first laser light beam and a second light beam control signal Cr for use in generating the second laser light beam to the light beam control blocks 49a and 49b, a motor speed control signal Cm for controlling the motor to keep rotating at the predetermined speed to the motor control portion 65, a distribution control signal Cd for delivering the light beam modulating signal Sm selectively to the light beam control block 49a and the light beam control block 49b, a selection control signal Cs for selecting the data signal, the erasing signal or any other signal as the light beam modulating signal Sm to the recording/erasing signal supplying block 53.

Besides, the system controller 61 supplies also flag data Dg as mentioned later to the recording/erasing signal supplying block 53 so that the light beam modulating signal Sm is composed of the flag data Dg under a specified situation.

Figure 3:
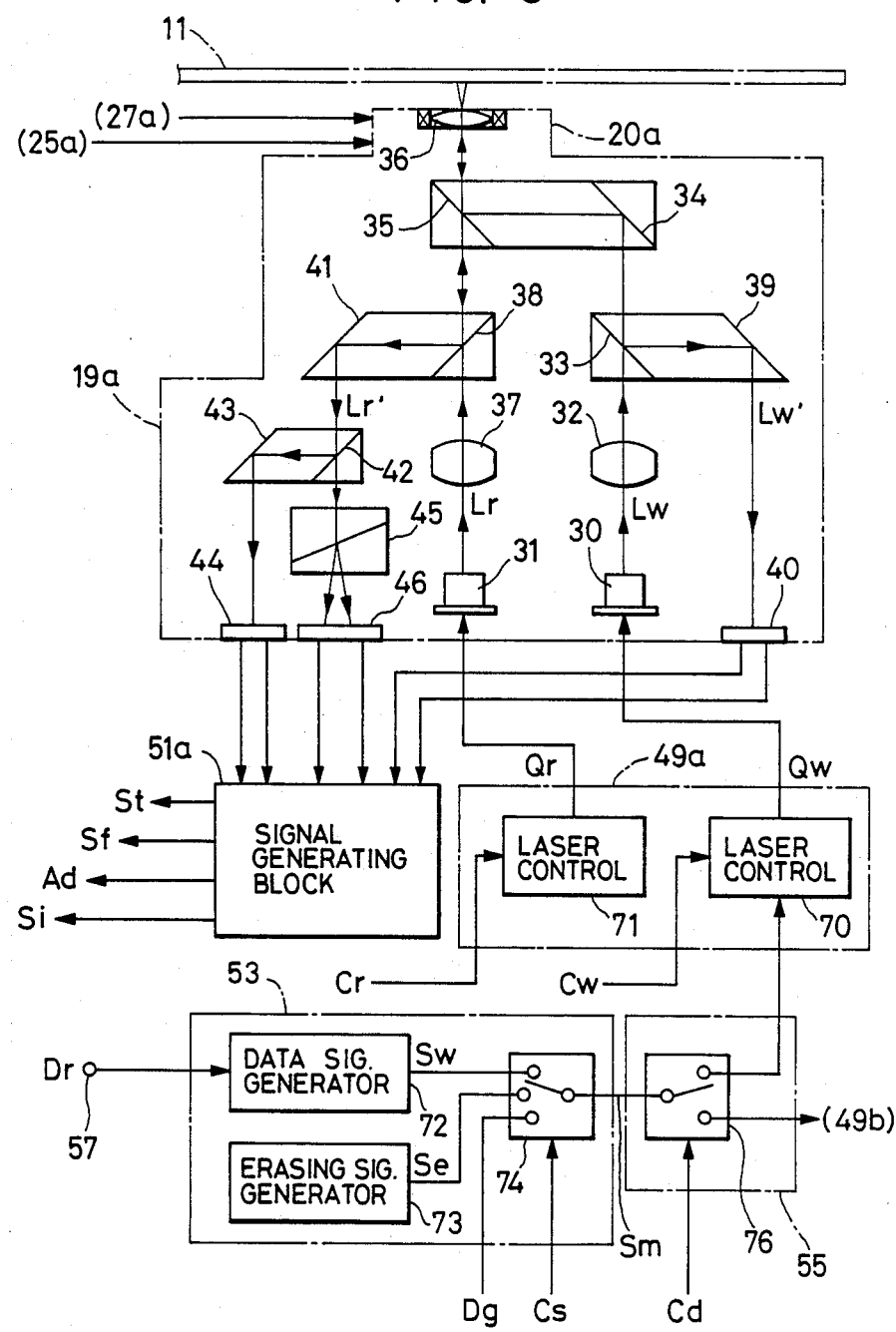
FIG. 3 is a schematic illustration showing examples of an optical head and portions related thereto used in the embodiment shown in FIG. 1.

The optical heads 19a and 19b are of the same inner configuration and one of which, for example, the optical head 19a is constituted as shown in FIG. 3.

In the optical head 19a, semiconductor laser elements 30 and 31 are provided. The semiconductor laser element 30 is driven by a laser control portion 70 included in the light beam control block 49a to emit a laser light beam Lw having a wavelength of for example, 830 nm and provided with relatively large power as the first laser light beam which is used selectively for erasing and writing an information signal in the magnetooptic disc 11, and the semiconductor laser element 31 is driven by a laser control portion 1 which constitutes the light beam control block 49a together with the laser control portion 70 to emit a laser light beam Lr having a wavelength of, for example, 780 nm and provided with relatively small power as the second laser light beam which is used for reading an information signal written in the magnetooptic disc 11.

The laser control portion 70 supplies the driving signal Qw, which is produced in response to the light beam modulating signal Sm supplied to the laser control portion 70 through the signal distributor 55 from the recording/ erasing signal supplying block 53, to the semiconductor laser element 30 in accordance with the first light beam control signal Cw, so that the laser light beam Lw modulated in response to the light beam modulating signal Sm is obtained from the semiconductor laser element 30.

The recording/erasing signal supplying block 53 comprises a data signal generator 72 for producing a data signal Sw corresponding to the recording data Dr, an erasing signal generator 73 for producing an erasing signal Se, and a switch 74 for deriving selectively the data signal Sw, the erasing signal Se and the flag data Dg supplied from the system controller 61 as the light beam modulating signal Sm in accordance with the selection control signal Cs from the system controller 61. The signal distributor 55 comprises a switch 76 for supplying the light beam modulating signal Sm derived from the switch 74 contained in the recording/erasing signal supplying block 53 to the light beam control blocks 49a and 49b selectively in accordance with the distribution control signal Cd from the system controller 61.

The laser control portion 71 supplies the driving signal Qr having a constant level to the semiconductor laser element 31 in accordance with the second light beam control signal Cr, so that the laser light beam Lr provided with a constant power is obtained from the semiconductor laser element 31.

Figure 4A:
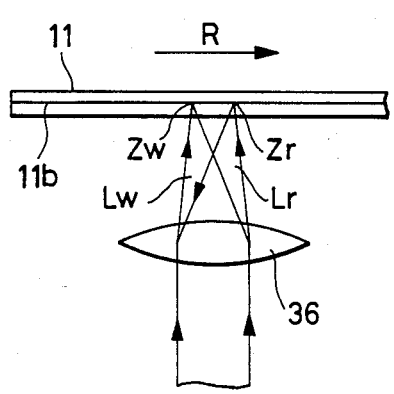
FIGS. 4A and 4B are schematic illustrations used for explaining light beams impinging upon a magnetooptic disc from the optical head shown in FIG. 3.
Figure 4B:
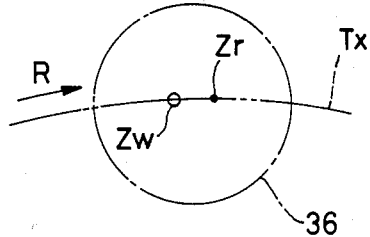

The laser light beam Lw emitted from the semiconductor laser element 30 is collimated by a collimator lens 32 to pass through, a beam splitter 33 and then reflected by dichroic mirrors 34 and 35 to enter into an objective lens 36 contained in the projecting portion 20a, by which the laser light beam Lw is focused on the magnetooptic disc 11 loaded on the disc driving table 13. The laser light beam Lr emitted from the semiconductor laser element 31 is collimated by a collimator lens 37 and passes through a beam, splitter 38 and the dichroic mirror 35 to enter into the objective lens 36 by which the laser light beam Lr is focused on the magnetooptic disc 11. Accordingly, the objective lens 36 is provided in common to both the laser light beams Lw and Lr and operative to focus each of the laser light beams Lw and Lr on the same record track on the magnetooptic disc 11. On that occasion, as shown in FIGS. 4A, and 4B, the laser light beams Lw and Lr focused by the objective lens 36 impinge respectively upon positions Zw and Zr on a record track Tx which is one of the record tracks formed in a vertically magnetized layer 11b of the magnetooptic disc 11. The positions Zw and Zr are very close to each other, and the position Zw upon which the laser light beam Lw impinges precedes the position Zr upon which the laser light beam Lr impinges toward such movement of the record track Tx as indicated by an arrow R in FIGS. 4A and 4B.

With the laser light beam Lw impinging upon the record track on the magnetooptic disc 11, the direction of magnetization in the vertically magnetized layer is inverted or caused to remain in accordance with the light beam modulating signal Sm at each sector contained in the record track, so that erasure of data or writing of data is carried out in each sector. The laser light beam Lw is reflected at the record track to be a reflected laser light beam Lw' returning in the pass through the object lens 36. The reflected laser light beam Lw' passing through the object lens 36 is reflected by both the dichroic mirrors 35 and 34 and then further reflected by both the beam splitter 33 and a mirror 39 to be guided to a photodetector 40. The photodetector 40 produces a detection output signal in response to variations in the reflected laser light beam Lw' and supplies the same to the signal generating block 51a. In the signal generating block 51a, the focus error signal Sf corresponding to the state of focus of the laser light beam Lw on the magnetooptic disc 11 is produced based on the detection output signal from the photodetector 40.

On the other hand, with the laser light beam Lr impinging upon the record track on the magnetooptic disc 11, the address data which are recorded in each sector with, for example, an arrangement of pits and the data which are written in each sector with inversions in the direction of magnetization in the vertically magnetized layer are read. In reading of the address data, the laser light beam Lr impinging upon the sector is modulated with the arrangement of pits on the occasion of reflection thereat, and in reading of the data, the laser light beam Lr impinging upon the sector is provided, in accordance with the Kerr effect, with rotations of a polarization plane thereof in response to the inversions in the direction of magnetization in the vertically magnetized layer on the occasion of reflection thereat.

The laser light beam Lr which is thus modulated and provided with the rotations of the polarization plane thereof at each sector in the record track is reflected from the record track to be a reflected laser light beam Lr' returning in the pass through the object lens 36. The reflected laser light beam Lr' passing through the objective lens 36 passes through the dichroic mirrors 35 and then is reflected by both the beam splitter 38 and a mirror 41 to be guided to a half mirror 42. A part of the reflected laser light beam Lr' guided to the half mirror 42 is reflected by the half mirror 42 and a mirror 43 to be guided to a photodetector 44. Further, another part of the reflected laser light beam Lr' guided to the half mirror 42 passes through the half mirror 42 and enters into a Wollaston prism 45.

The photodetector 44 produces a detection output signal in response to variations in the reflected laser light beam Lr' caused by the modulation with the arrangement of pits and supplies the same to the signal generating block 51a. Thereby, in the signal generating block 51a, the reproduced address data Ad are produced based on the detection output signal from the photodetector 44. The part of the reflected laser light beam Lr' entering into the Wollaston prism 45 is separated into a pair of orthogonal polarized components thereof by the Wollaston prism 45 and guided to a photodetector 46. The photodetector 46 receives the orthogonal polarized components of the reflected laser light beam Lr' separately and produces two detection output signals in response to variations in the orthogonal polarized components of the reflected laser light beam Lr', respectively, to be supplied to the signal generating block 51a. In the signal generating block 51a, the detection output signals from the photodetector 46 are compared with each other to produce a comparison output corresponding to the rotation of the polarization plane of the reflected laser light beam Lr' and the reproduced information signal Si is obtained based on the comparison output.

In addition, the tracking error signal St which corresponds to the state of tracking of the laser light beam Lr in relation to the record disc on the magnetooptic disc 11 is also produced in the signal generating block 51a.

The optical head 19b is constituted in the same manner as the optical head 19a as described above and therefore the light beam control block 49b has the same configuration as the light beam control block 49a.

Figure 5:
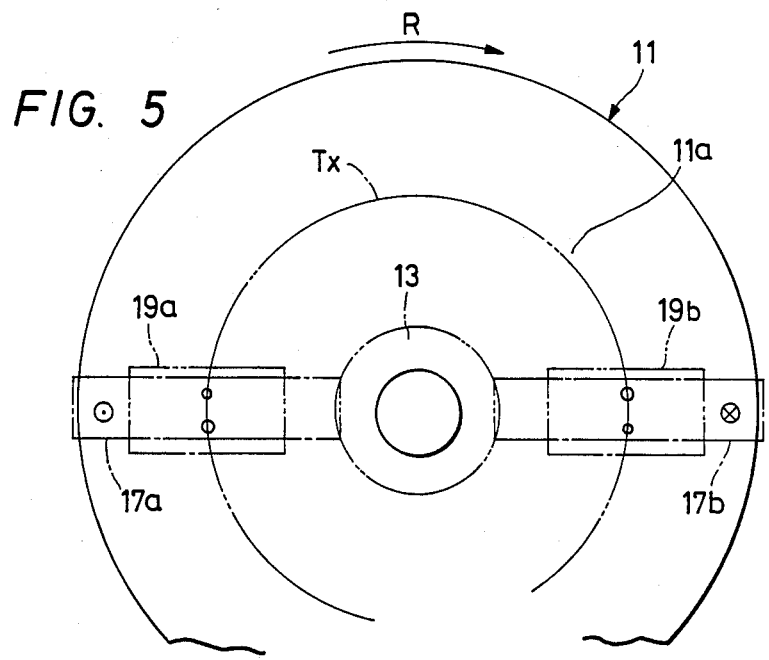
FIG. 5 is a schematic illustration used for explaining the information recording operation of the embodiment shown in FIG. 1.
Figure 6A:
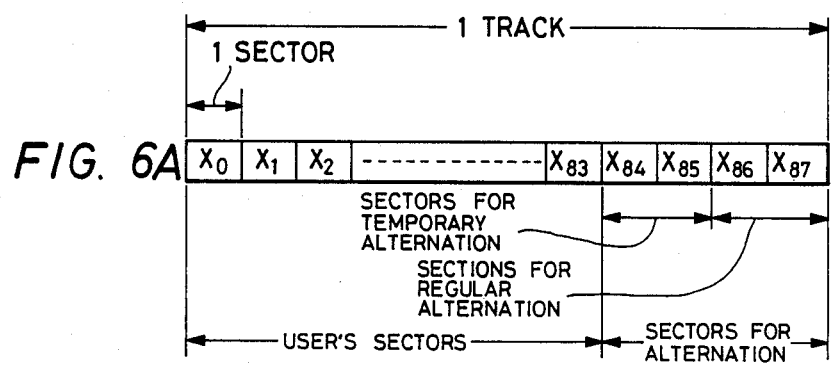
FIGS. 6A, 6B and 6C are schematic illustrations used for explaining a track and a sector on a magnetooptic disc on which information is recorded by the embodiment shown in FIG. 1.
Figure 6B:
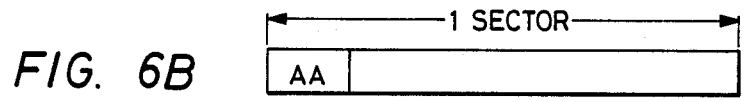

In the magnetooptic disc 11, each of the record tracks which formed in the record track area 11a to include the record track Tx as shown in FIG. 5, is partitioned into, for example, eighty-eight sectors $X_0$ to $X_{87}$, as shown in FIG. 6A. The sectors $X_0$ to $X_{83}$ are used as user's sectors, in each of which the data are ordinarily written, and the sectors $X_{84}$ to $X_{87}$ located at a terminal end portion of each record track are used as sectors for alternation, in each of which the data is rewritten when it is not properly written in one of the sectors $X_0$ to $X_{83}$. More particularly, in the sectors $X_{84}$ to $X_{87}$ used as the alternate sectors, the sectors $X_{84}$ and $X_{85}$ are used as sectors for temporary alternation and the sectors $X_{86}$ and $X_{87}$ are used as sectors for regular alternation. Each of the sectors $X_0$ to $X_{87}$ is provided at a beginning portion thereof with an address data portion AA in which address data identifying each sector are prerecorded with an arrangement of pits.

Further, the magnetooptic disc 11 may be provided at an inner fringe portion of the record track area 11a with several record tracks which are used as tracks for alternation when the sectors for alternation provided in each record track are insufficient for rewriting data.

In the case where new data are recorded in selected sectors contained in the record track Tx formed in the record track area 11a of the magnetooptic disc 11, as shown in FIG. 5, with the embodiment of apparatus according to the present invention constituted as described above, erasure of data written previously in the selected sectors, writing of the new data in the selected sectors, verification of the new data written in the selected sections and, as occasion demands, rewriting of the new data in the sectors for alternation in accordance with the result of the verification are performed in such a manner as described below.

First, the magnetooptic disc 11 is loaded on the disc driving table 13, so that the record track area 11a is put between the magnet 17a and the optical head 19a and also between the magnet 17b and the optical head 19b, as shown in FIG. 5. The magnetic fields produced by the magnets 17a and 17b respectively act upon the record track area 11a of the magnetooptic disc 11 in directions opposite to each other, as indicated with direction marks in FIG. 5. The magnetooptic disc 11 is turned at a predetermined speed in the direction indicated by the arrow R in FIG. 5.

Then, the first command signal DM arranged to designate the data writing operating mode and the second command signal DA arranged to assign, for example, the sectors $X_n$ to $X_{n+3}$ contained in the record track Tx as the selected sectors, are supplied to the system controller 61. The system controller 61 sends out the second light beam control signal Cr and the access control signal Ca in response to the first command signal DM and the second command signal DA supplied thereto, so that the laser light beams Lr emitted from the optical heads 19a and 19b, respectively, are caused to impinge on the magnetooptic disc 11 so as to have their respective incident positions on the same record track. During the reading of the address data recorded in each sector by the laser light beams Lr, the reproduced address data Ad are obtained from both the signal generating blocks 51a and 51b to be supplied to the system controller 61 and an access operation by which the incident positions of the laser light beams Lr on the magnetooptic disc 11 are controlled to reach the record track Tx containing the selected sectors, namely, the sections $X_n$ to $X_{n+3}$ is carried out.

When the incident positions of the laser light beams Lr on the magnetooptic disc 11 reach the record track Tx as a result of the access operation, the laser light beams Lr are caused to keep their respective incident positions on the record track Tx. After that, when one of the laser light beams Lr from the optical heads 19a and 19b, for example, the laser light beam Lr from the optical head 19a reaches the sector $X_n$ with the rotation of the magnetooptic disc 11, the system controller 61 sends out the selection control signal Cs arranged to select the erasing signal Se, the distribution control signal Cd arranged to command delivery of the light beam modulating signal Sm to the light beam control block 49a and the first light beam control signal Cw. Thereby, the laser light beam Lw emitted from the optical head 19a is modulated with the erasing signal Se and caused to impinge on the sector $X_n$, and during a period in which the laser light beam Lw from the optical head 19a scans the sectors $X_n$ to $X_{n+3}$ with the rotation of the magnetooptic disc 11, the data written in the sectors $X_n$ to $X_{n+3}$ are erased. When the laser light beam Lw from the optical head 19a finishes scanning the sectors $X_n$ to $X_{n+3}$, the system controller 61 ceases sending out the selection control signal Cs, the distribution control signal Cd and the first light beam control signal Cw, so that optical head 19a is caused to cease emitting the laser light beam Lw.

Thereafter, when the incident position of the laser light beam Lr from one of the optical heads 19a and 19b reaches the sector $X_{84}$ provided to be used as the sector for temporary alternation in the record track Tx with the rotation of the magnetooptic disc 11, the system controller 61 sends out again the selection control signal Cs arranged to select the erasing signal Se, the distribution control signal Cd arranged to command delivery of the light beam modulating signal Sm to the light beam control block 49a or 49b connected to the optical head 19a or 19b which emits the laser light beam Lr impinging on the sector $X_{84}$, and the first light beam control signal Cw. Thereby, the laser light beam Lw from the optical head 19a or 19b is modulated with the erasing signal Se and caused to impinge on the sector $X_{84}$, and during a period in which the laser light beam Lw from the optical head 19a or 19b scans the sectors $X_{84}$ and $X_{85}$ with the rotation of the magnetooptic disc 11, the data written in the sectors $X_{84}$ and $X_{85}$ are erased. When the laser light beam Lw from the optical head 19a or 19b finishes scanning the sectors $X_{84}$ and $X_{85}$, the system controller 61 ceases sending out the selection control signal Cs, the distribution control signal Cd and the first light beam control signal Cw, so that optical head 19a or 19b is caused to cease emitting the laser light beam Lw.

After the data written in the sectors $X_n$ to $X_{n+3}$ and $X_{84}$ and $X_{85}$ are erased, the incident position of the laser light beam Lr emitted from the optical head 19b reaches the sector $X_n$. On that occasion, the system controller 61 sends out the selection control signal Cs arranged to select the data signal Sw, the distribution control signal Cd arranged to command delivery of the light beam modulating signal Sm to the light beam control block 49b and the first light beam control signal Cw. Thereby, the laser light beam Lw from the optical head 19b is modulated with the data signal Sw and caused to impinge on the sector $X_n$, and during a period in which the laser light beam Lw from the optical head 19b scans the sector $X_n$, the recording data Dr supplied from the terminal 57 are written in the sector $X_n$ to form a data record area a predetermined distance from the address data portion AA in the sector $X_n$.

The record data Dr written thus in the data record area in the sector $X_n$ are immediately read by the laser light beam Lr from the optical head 19b which follows the laser light beam Lw to scan the data record area in the sector $X_n$ and the reproduced information signal Si is obtained from the signal generating block 51b to be supplied to the signal processor 59. Therefore, the signal Si' for verification is supplied to the system controller 61 from the signal processor 59 and it is checked based on the signal Si' for verification whether or not the recording data Dr is properly written in the data record area in the sector $X_n$ in the system controller 61, in other words, the recording data written in the data record area in the sector $X_n$ are verified in the system controller 61.

If it is clarified as a result of such verification that the recording data Dr is properly written in the data record area in the sector $X_n$, the system controller 61 sends out the flag data Dg indicating the proper writing of the recording data Dr and causes the same to be supplied to the signal distributor 55 with the selection control signal Cs arranged to select the flag data Dg. To the contrary, if it is clarified that the recording data Dr is not written properly in the data record area in the sector $X_n$, the system controller 61 sends out the flag data Dg indicating the improper writing of the recording data Dr and thereby causes the recording/erasing signal supplying block 53 to hold the recording data Dr and further causes the flag data Dg indicating the improper writing of the recording data Dr to be supplied to the signal distributor 55 with the selection control signal Cs arranged to select the flag data Dg. Accordingly, in both cases, the laser light beam Lw from the optical head 19b is modulated with the flag data Dg and caused to impinge on a portion of the sector $X_n$ following to the data record area, so that the flag data Dg is written to form a flag data portion a predetermined distance from the data record area in the sector $X_n$.

Figure 6C:
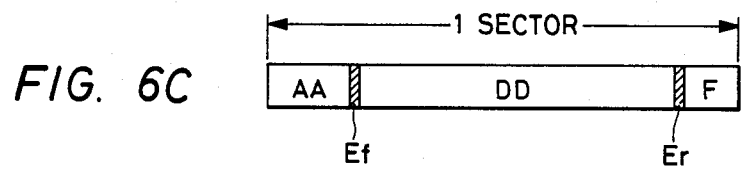

With the writing of the recording data Dr and the flag data Dg thus conducted, as shown in FIG. 6C, the sector $X_n$ is provided with the address data portion AA formed at a beginning portion, a data record area DD in which the recording data are written and formed to be successive with a space portion Ef to the address data portion AA, and a flag data portion F in which the flag data are written and formed to be successive with a space portion Er to the data record area DD at a terminal end portion.

After the data recording in the sector $X_n$ is carried out as described above, the incident position of the laser light beam Lr from the optical head 19b reaches the sector $X_{n+1}$ next to the sector $X_n$. On that occasion, the system controller 61 performs the same operation as the aforementioned case in which the incident position of the laser light beam Lr from the optical head 19b reaches the sector $X_n$, so that the data recording in the sector $X_{n+1}$ is carried out in the same manner as the data recording in the sector $X_n$. Further, the data recording in each of the sector $X_{n+2}$ and the sector $X_{n+3}$ is carried out also in the same manner as the data recording in the sector $X_n$.

As described above, the recording data Dr are written in the selected sectors, that is, the sectors $X_n$ to $X_{n+3}$ contained in the record track Tx is carried out, and each of the sectors $X_n$ to $X_{n+3}$ is provided with the address data portion AA, space portion Ef, data record area DD, space portion Ef and flag data portion F in such a manner as shown in FIG. 6C. In the case where the flag data Dg written in the flag data portion in each of the sectors $X_n$ to $X_{n+3}$ indicate the proper writing of the recording data Dr, the recording of new data in the sectors $X_n$ to $X_{n+3}$ is terminated when the writing of the flag data Dg in the sector $X_{n+3}$ is completed.

A relation between recording information, such as the recording data Dr written in the data record area DD or the flag data Dg written in the flag data portion F, and the inversions in the direction of magnetization in the vertically magnetized layer at the data record area DD or the flag data portion shown in FIGS. 7A to 7F by way of example. In the relation shown in FIGS. 7A to 7F, a frequency modulated signal Iw having level inversions caused at each boundary between data bit intervals t representing "0" or "1" and also at the center of each data bit interval t representing "1", as shown in FIG. 7A, is produced based on the recording information, and the magnetization in the vertically magnetized layer is arranged to have two opposite directions corresponding to high and low levels of the frequency modulated signal Iw, respectively, as shown with arrows in FIG. 7B or 7C, so that each inversion in the direction of magnetization in the vertically magnetized layer is caused in response to each level inversion of the frequency modulated signal Iw. When the recording information recorded in the vertically magnetized layer is read, the reproduced information signal Si with high and low levels corresponding to the directions of magnetization in the vertically magnetized layer in such a manner as shown in FIG. 7D is obtained from the vertically magnetized layer in which the inversions in the direction of magnetization shown in FIG. 7B are made, and the reproduced information signal Si with high and low levels corresponding to the directions of magnetization in the vertically magnetized layer in such a manner as shown in FIG. 7E is obtained from the vertically magnetized layer in which the inversions in the direction of magnetization shown in FIG. 7C are made. Although the reproduced information signals Si shown respectively in FIGS. 7D and 7E have opposite level variations, the same reproduced data including an arrangement of "0" and "1" which corresponds to the recording information, as shown in FIG. 7F, is obtained from each of them.

The inversions in the direction of magnetization in the vertically magnetized layer such as shown in FIG. 7B and the inversions in the direction of magnetization in the vertically magnetized layer such as shown in FIG. 7C are realized respectively, for example, in the case where the recording data Dr are written in the data record area DD with the laser light beam Lw from the optical head 19a under a condition wherein the magnetic field produced by the magnet 17a acts on the vertically magnetized layer at the data record area DD and in the case where the recording data Dr are written in the data record area DD with the laser light beam Lw from the optical head 19b under a condition wherein the magnetic field produced by the magnet 17b acts on the vertically magnetized layer at the data record area DD, because the magnetic fields produced by the magnets 17a and 17b, respectively, have opposite directions. However, in either case in which the recording data Dr written in the data record area DD are read with the laser light beam Lr from the optical head 19a or the laser light beam Lr from the optical head 19b, the same reproduced data Dr' corresponding to the recording data Dr are obtained in the manner as mentioned above.

On the other hand, in the case where at least one of the sectors $X_n$ to $X_{n+3}$ is a defective sector which is provided with the flag data Dg written in the flag data portion therein which indicate the improper writing of the recording data Dr, when the incident position of the laser light beam Lr emitted from one of the optical heads 19a and 19b reaches the sector $X_{84}$ provided to be used as the sector for alternation in the record track Tx after the writing of the flag data Dg in the sector $X_{n+3}$ is completed, the system controller 61 sends out the selection control signal Cs arranged to select the data signal Sw held by the recording/erasing signal supplying block 53, the distribution control signal Cd arranged to command delivery of the light beam modulating signal Sm to the light beam control block 49a or 49b connected to the optical head 19a or 19b which emits the laser light beam Lr impinging the sector $X_{84}$, and the first light beam control signal Cw. Thereby, the laser light beam Lw from the optical head 19a or 19b is modulated with the data signal Sw and caused to impinge on the sector $X_{84}$, and during a period in which the laser light beam Lw from the optical head 19a or 19b scans the sector $X_{84}$, the recording data Dr, which is previously written in the defective sector, is rewritten in the sector $X_{84}$ to form a data record area successive with a predetermined space to a address data portion AA in sector $X_{84}$.

After the data record area is formed in the sector $X_{84}$, the system controller 61 sends out a flag data Dg which indicates address data corresponding to the defective sector and causes the same to be supplied to the signal distributor 55 with the selection control signal Cs arranged to select the flag data Dg. Accordingly, the laser light beam Lw from the optical head 19a or 19b is modulated with the flag data Dg and caused to impinge on a portion of the sector $X_{84}$ following the data record area, so that the flag data Dg is written in such a portion to form a flag data portion successive with a predetermined space to the data record area in the sector $X_{84}$. Thus, alternation of sectors is achieved for the defective sector in the sectors $X_n$ to $X_{n+3}$. Such alternation of sectors can be achieved also with use of the sector $X_{85}$ in the record track Tx, and therefore it is possible to conduct the alternation of sectors for at most two defective sectors in the sectors $X_n$ to $X_{n+3}$ with use of the sectors for temporary alternation in the record track Tx. In the case where the alternation of sectors is achieved, the recording of new data in the sectors $X_n$ to $X_{n+3}$ is terminated when the writing of the flag data Dg in one or both of the sectors $X_{84}$ and $X_{85}$ is completed.

When the recording of new data in the sectors $X_n$ to $X_{n+3}$ which are assigned by the second command signal DA is terminated, the system controller 61 sends out the first light beam control signal Cw, second light beam control signal Cr, distribution control signal Cd and selection control signal Cs selectively so as to shift the recording data and the flag data written in one or both of the sectors $X_{84}$ and $X_{85}$ to one or both of the sectors $X_{86}$ and $X_{87}$ provided to be used as sectors for regular alternation.

In the case where the second command signal DA assigns all of the sectors $X_0$ to $X_{83}$ which are provided to be used as user's sectors as selected sectors in which new data are to be written, erasure of data written in the sectors $X_{86}$ and $X_{87}$ is conducted in place of the erasure of data written in the sectors $X_{84}$ and $X_{85}$, and recording data which are written previously in defective sectors are rewritten directly in the sectors $X_{86}$ and $X_{87}$ without rewriting of the recording data in the sectors $X_{84}$ and $X_{85}$.

Further, in any case of the alternation of sectors, when the sectors $X_{84}$ and $X_{83}$ provided to be used as sectors for temporary alternation or the sectors $X_{86}$ and $X_{87}$ provided to be used as sectors for regular alternation in the record track Tx are insufficient in capacity for rewriting data the system controller 61 supplies the access control signal Ca arranged appropriately for controlling the incident positions of the laser light beams Lw and Lr from the optical heads 19a and 19b on the magnetooptic disc 11 so as to rewrite data which are written previously in defective sectors in record tracks which are provided to be used as tracks for alternation at the inner fringe portion of the track record area 11a on the magnetooptic disc 11.

In the embodiment of apparatus according to the present invention, the writing of new data in selected sectors in the magnetooptic disc 11 is performed under the control by the system controller 61 in the manner as described above, and therefore the alternation of sections is carried out without a dead time wasted to wait for completion of each turn of the magnetooptic disc 11 and consequently without reducing substantially a data transfer speed.

Further, since the sectors for alternation provided in each record track on the magnetooptic disc 11 is separated into the sectors for temporary alternation and the sectors for regular alternation, and first the sectors for temporary alternation are used for rewriting data which are written previously in defective sectors and then the data written in the sectors for temporary alternation are shifted to the sectors for regular alternation at the end of the writing of new data in the selected sectors when the selected sectors are not all of the sectors $X_0$ to $X_{83}$ which are provided to be used as user's sectors contained in each record track, the alternation of sectors is carried out without reducing substantially the data transfer speed even in the case where the rewriting of the data is repeated in the writing of new data in the selected sectors.

Figure 8:
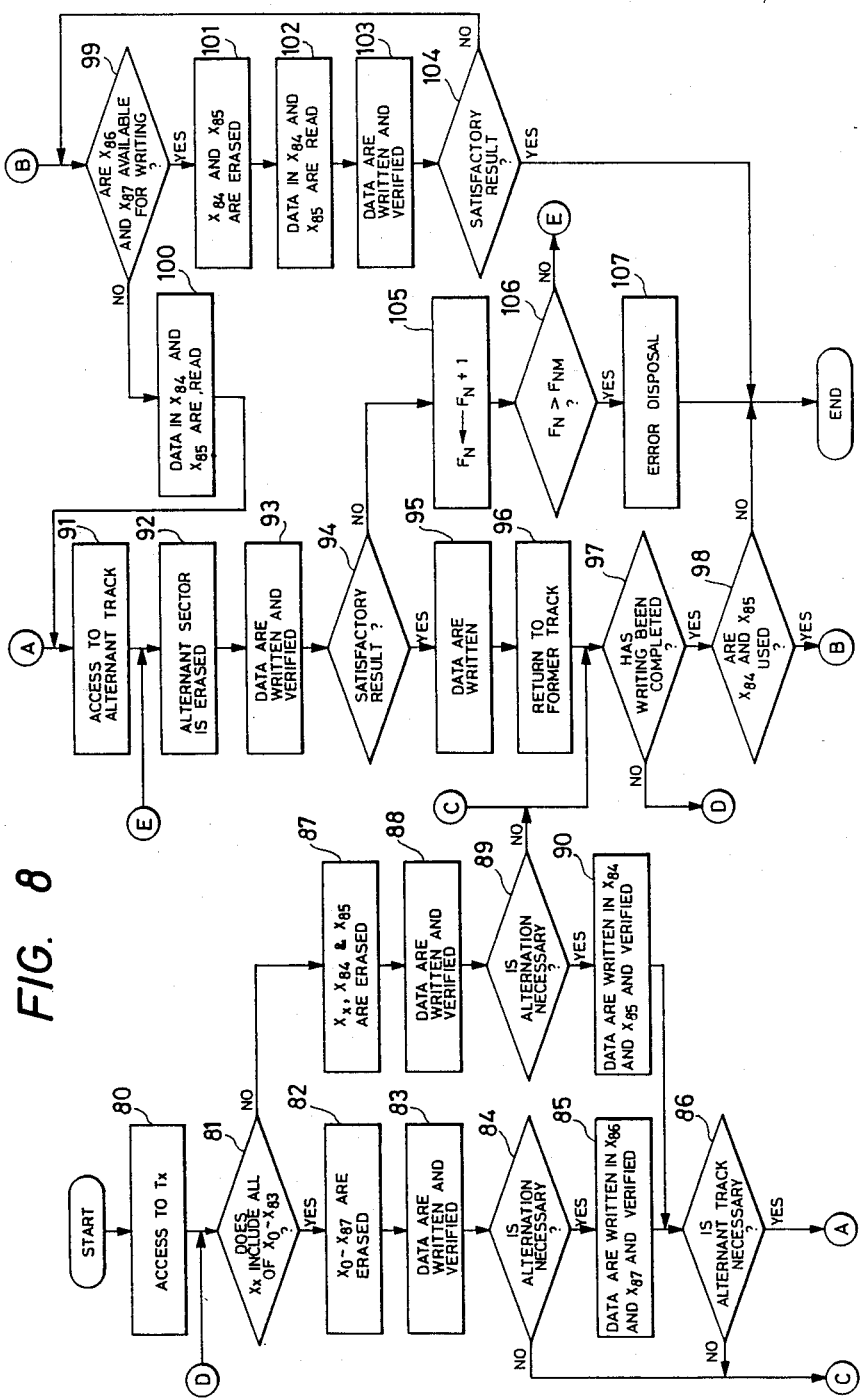
FIG. 8 is a flow chart showing an example of a control program of a microcomputer in a system controller employed in the embodiment shown in FIG. 1.

The system controller 61 effecting the control operation as described above is constituted with, for example, a microcomputer and an example of the operation program of the microcomputer for such control operation is carried out in accordance with a flow chart shown in FIG. 8.

In the case of the flow chart shown in FIG. 8, after the start, in a process 80, the head drivers 23a and 23b and the tracking control blocks 25a and 25b are set for performing the access operation by which the incident positions of the laser light beams Lw and Lr emitted from the optical heads 19a and 19b on the magnetooptic disc 11 are controlled to reach the record track Tx selected by the second command signal DA. Next, in a decision 81, it is checked whether or not selected sectors (referred to as sectors $X_x$) which are assigned by the second command signal DA so that new data are to be written thereon include all of the sectors $X_0$ to $X_{83}$ provided to be used as user's sectors contained in the record track Tx. When the sectors $X_x$ include all of the sectors $X_0$ to $X_{83}$, the laser light beam Lw from one of the optical heads 19a and 19b is caused to erase data written in the sectors $X_0$ to $X_{83}$ and in the sectors $X_{44}$ to $X_{87}$ provided to be used as sectors for alternation, in a process 82. Then, in a process 83, the laser light beam Lw from the other of the optical heads 19a and 19b and the laser light beam Lr following that laser light beam Lw to scan the record track Tx are caused to write the recording data Dr in each of the sectors $X_0$ to $X_{83}$, read the recording data Dr written in each of the sectors $X_0$ to $X_{83}$, and write the flag data Dg which corresponds to the result of the reading of the recording data Dr in each of the sectors $X_0$ to $X_{83}$. On that occasion, it is checked whether or not the recording data Dr is properly written in each of the sectors $X_0$ to $X_{83}$ for verifying the recording data Dr written in each of the sectors $X_0$ to $X_{83}$, based on the signal Si' for verification which is obtained from the signal processor 59 in response to the recording data Dr read by the laser light beam Lr, and the flag data Dg are arranged to correspond to the result of the verification. Further, the recording data Dr which are written in each defective sector in which the recording data Dr is not written properly are maintained.

In a decision 84, it is checked based on the result of the verification in the process 83 whether or not the alternation of sectors is necessary. If the alternation of sectors is unnecessary because no defective sector is made during the writing of the recording data Dr in the sectors $X_0$ to $X_{83}$, the step proceeds to a decision 97. To the contrary, when the alternation of sectors is necessary because at least one defective sector is made during the writing of the recording data Dr in the sectors $X_0$ to $X_{83}$, the laser light beam Lw from the other of the optical heads 19a and 19b is caused to write the recording data Dr maintained in the process 83 and the flag data Dg which indicates address data corresponding to the defective sector in at least one of the sectors $X_{86}$ and $X_{87}$ which are provided to be used as sectors for regular alternation in the record track Tx, the laser light beam Lr from the other of the optical heads 19a and 19b is caused to read the recording data Dr written in one or both of the sectors $X_{86}$ and $X_{87}$, and the recording data Dr written in one or both of the sectors $X_{86}$ and $X_{87}$ are verified based on the signal Si' for verification which is obtained at that time in response to the recording data Dr read from the sectors $X_{86}$ and $X_{87}$ by the laser light beam Lr, in a process 85. Then, the step proceeds to a decision 86.

On the other hand, if it is clarified, as a result of the check in the decision 81, that the sectors $X_x$ include a part of the sectors $X_0$ to $X_{83}$, the laser light beam L from one of the optical heads 19a and 19b is caused to erase data written in the sectors $X_x$ and in the sectors $X_{84}$ and $X_{85}$, in a process 87. Then, in a process 88, the laser light beam Lw from the other of the optical heads 19a and 19b and the laser light beam Lr following that laser light beam Lw to scan the record track Tx are caused to write the recording data Dr in each of the sectors $X_x$, read the recording data Dr written in each of the sectors $X_x$, and write the flag data Dg which corresponds to the result of the reading of the recording data Dr in each of the sectors $X_x$. On that occasion, it is checked whether or not the recording data Dr are properly written in each of the sectors $X_x$ for verifying the recording data Dr written in each of the sectors $X_x$, based on the signal Si' for verification which is obtained from the signal processor 59 in response to the recording data Dr read by the laser light beam Lr, and the flag data Dg are arranged to correspond to the result of the verification. Further, the recording data Dr which are written in each defective sector in which the recording data Dr is not written properly are maintained.

Then, in a decision 89, it is checked based on the result of the verification in the process 88 whether or not the alternation of sectors is necessary. If the alternation of sectors is unnecessary because no defective sector is made during the writing of the recording data Dr in the sectors $X_x$, the step proceeds to the decision 97. To the contrary, when the alternation of sectors is necessary because at least one defective sector is made during the writing of the recording data Dr in the sectors $X_x$, the laser light beam Lw from the other of the optical heads 19a and 19b is caused to write the recording data Dr maintained in the process 88 and the flag data Dg which indicates address data corresponding the defective sector in at least one of the sectors $X_{84}$ and $X_{85}$ which are provided to be used as sectors for temporary alternation in the record track Tx, the laser light beam Lr from the other of the optical heads 19a and 19b is caused to read the recording data Dr written in one or both of the sectors $X_{84}$ and $X_{85}$, and the recording data Dr written in one or both of the sectors $X_{84}$ and $X_{85}$ are verified based on the signal Si' for verification which is obtained at that time in response to the recording data Dr read from the sectors $X_{84}$ and $X_{85}$ by the laser light beam Lr, in a process 90. Then, the step proceeds to the decision 86.

In the decision 86, it is checked based on the result of the verification obtained in the process 85 or 90 whether or not alternation of sectors is required to be carried out with use of the tracks for alternation which are provided at the inner fringe portion of the record track area 11a of the magnetooptic disc 11. If the alternation of sectors with use of the track for alternation is unnecessary, the step proceeds to the decision 97. To the contrary, when the alternation of sectors with use of the track for alternation is necessary, the head drivers 23a and 23b and the tracking control blocks 25a and 25b are set for performing the access operation by which the incident positions of the light beams Lw and Lr from the optical heads 19a and 19b on the magnetooptic disc 11 are controlled to reach the track for alternation, in a process 91.

Next, in a process 92, the laser light beam Lw from one of the optical heads 19a and 19b is caused to erase data written in sectors in the track for alternation in which the recording data Dr are to be rewritten. Then, in a process 93, the laser light beam Lw from the other of the optical heads 19a and 19b and the laser light beam Lr following that laser light beam Lw to scan the track for alternation are caused to write the recording data Dr which are previously written in the defective sectors in the sectors contained in the track for alternation from which the data are erased, read the recording data Dr written in the sectors contained in the track for alternation, and it is checked whether or not the recording data Dr are properly written in the sectors contained in the track for alternation for verifying the recording data Dr written in the sectors contained in the track for alternation, based on the signal Si' for verification which is obtained from the signal processor 59 in response to the recording data Dr read by the laser light beam Lr.

After that, in a decision 94, it is checked whether or not the result of the verification conducted in the process 93 is satisfactory. If the result of the verification conducted in the process 93 is satisfactory, the laser light beam Lr from the other of the optical heads 19a and 19b is caused to write the flag data Dg which indicate address data corresponding to the defective sectors in the sectors contained in the track for alternation, in a process 95. Then, in a process 96, the head drivers 23a and 23b and the tracking control blocks 25a and 25b are set for performing the access operation by which the incident positions of the laser light beams Lw and Lr from the optical heads 19a and 19b on the magnetooptic disc 11 are controlled to reach again the record track Tx. After that, the step proceeds to the decision 97.

In the decision 97, it is checked whether or not the writing of the recording data Dr in the sectors $X_x$ has been completed, and if the writing of the recording data Dr in the sectors $X_x$ has not been completed, the step returns to the decision 81 to repeat the above mentioned processes and decisions. In the case where the writing of the recording data Dr in the sectors $X_x$ has been completed, it is checked whether or not the data are written in the sectors $X_{84}$ and $X_{85}$ contained in the re-cord track Tx, in a dicision 98. If the data are not written in the sectors $X_{84}$ and $X_{85}$, the control is finished.

To the contrary, if it is clarified that the data are written in the sectors $X_{84}$ and $X_{85}$, it is checked whether or not the sectors $X_{86}$ and $X_{87}$ contained in the record track Tx are available for writing data, in a decision 99. When the sectors $X_{86}$ and $X_{87}$ are not available for writing data, the laser light beam Lr from the optical head 19a or 19b is caused to read the data written in the sectors $X_{84}$ and $X_{85}$ in a process 100 and then the step returns to the process 91 to repeat the processes and decisions between the process 91 and the decision 99 so that the data written in the sectors $X_{84}$ and $X_{85}$ are transferred to the track for alternation.

On the other hand, when the sectors $X_{86}$ and $X_{87}$ are available for writing data, the laser light beam Lw from the optical head 19a or 19b is caused to erase data written in the sectors $X_{86}$ and $X_{87}$ in a process 101, and the laser light beam Lr from the optical head 19a or 19b is caused to read the data written in the sectors $X_{84}$ and $X_{85}$ in a process 102. Then, in a process 103, the laser light beam Lw from the optical head 19a or 19b and the laser light beam Lr following that laser light beam Lw to scan the record track Tx are caused to write the data which are read from the sectors $X_{84}$ and $X_{85}$ in the sectors $X_{86}$ and $X_{87}$, read the data newly written in the sectors $X_{86}$ and $X_{87}$, and the data newly written in the sectors $X_{86}$ and $X_{87}$ are verified based on the signal Si' for verification which is obtained from the signal processor 59 in response to the recording data Dr read from the sectors $X_{86}$ and $X_{87}$ by the laser light beam Lr.

After that, in a decision 104, it is checked whether or not the result of the verification conducted in the process 103 is satisfactory. If the result of the verification conducted in the process 103 is satisfactory, the control is finished, and when the result of the verification conducted in the process 103 is not satisfactory, the step returns to the decision 99 to repeat the processes and decisions between the decision 99 and the decision 104 in the same manner as mentioned above.

Further, in the case where it is clalified that the result of the verification conducted in the process 93 is not satisfactory, an alternation flag $F_N$ is increased by one in a process 105, and then it is checked whether or not the number of alternation indicated by the alternation flag $F_N$ is more than a predetermined limiting number $F_{NM}$, in a decision 106. If the number of alternation indicated by the alternation flag $F_N$ is equal to or less than the predetermined limiting number $F_{NM}$, the step returns to the process 92 to repeat the processes and decisions after the process 91. To the contrary, if the number of alternation indicated by the alternation flag $F_N$ is more than the predetermined limiting number $F_{NM}$, the recording data Dr written in the sectors contained in the track for alternation are subjected to an appropriate error disposal in a process 107, and then the control is finished.

What is claimed is:

1. Apparatus for recording and reproducing information in record tracks on a rotatable record disc loaded in said apparatus, said apparatus comprising:
    disc drive means for rotating the rotatable record disc about an axis of rotation,
    first and second optical head means each facing the rotatable record disc and respectively positioned on opposite sides of said axis,
    each of said first and second optical head means generating a first light beam used selectively for erasing and writing an information signal in the record track and a second light beam used for reading an information signal from the record track and causing the first and second light beams to impinge upon the record track in such a manner that the first light beam precedes the second light beam in a direction along the record track, and
    head driving means for moving said first and second optical head means simultaneously towards or away from each other in a direction which is radial with respect to the disc and in a manner such that the distances of said first and second optical head means from said axis are maintained substantially equal to each other.

2. Apparatus according to claim 1, wherein said disc driving means comprises a disc driving table positioned rotatably between said first and second optical head means to engage the central portion of the rotatable record disc and a motor connected with said disc driving table to turn the same at a predetermined speed.

3. Apparatus according to claim 1, wherein said head driving means comprises a pair of guide members each disposed to extend in the radial direction on the rotatable record disc for guiding each of said first and second optical head means to move thereon and a pair of head drivers for moving said first and second optical head means along said pair of guide members, respectively.

4. Apparatus according to claim 3, wherein said head driving means is operative to control the movement of each of said first and second optical head means so that the first and second light beams emitted from each of said first and second optical head means impinge upon a common one of the record tracks provided on the rotatable record disc.

5. Apparatus according to claim 1, wherein each of said first and second optical head means comprises first and second laser light sources for generating said first and second light beams, respectively, objective lens means provided in common to said first and second light beams for focusing each of said first and second light beams from said first and second laser light sources on the rotatable record disc, and optical means for forming optical paths through which said first and second light beams respectively pass.

6. Apparatus according to claim 5, wherein each of said first and second optical head means further comprises photodetecting means for detecting at least said second light beam reflected from the rotatable record disc.

7. Apparatus according to claim 6, wherein said first and second laser light sources are operative to generate said first and second light beams with different wavelengths.

8. Apparatus according to claim 7, wherein said optical means includes light beam separating means disposed in the optical path provided in common to said first and second light beams for separating said first and second light beams both reflected from the rotatable record disc.

9. Apparatus according to claim 5 further comprising signal generating means for producing a reproduced information signal, a tracking error signal and a focus error signal based on a detection output signal obtained from said photodetecting means.

10. Apparatus according to claim 1 further comprising first magnetic field generating means disposed to face said first optical head means with the rotatable record disc extending therebetween, and second magnetic field generating means disposed to face said second optical head means with the rotatable record disc extending therebetween, each of said first and second magnetic field generating means extending in the radial direction on the rotatable record disc.

11. Apparatus according to claim 10, wherein said first and second magnetic field generating means are arranged to produce respective magnetic fields acting upon the rotatable record disc in respectively opposite directions.

12. Apparatus according to claim 1 further comprising light beam control means for causing said first light beam from one of said first and second optical head means to write the information signal in sectors each forming a portion of the record track and for causing said second light beam from one of said first and second optical head means to read the information signal written in the sectors, and operation control means for controlling the operation of said first and second optical head means and the operation of said light beam control means.

13. Apparatus according to claim 12, wherein said operation control means comprises means for causing said first light beam from one of said first and second optical head means to write the information signal in at least one of the sectors in the record track and to cause said second light beam to read the information signal written in said one sector, means for determining whether or not the information signal is properly written in said one sector based on the information signals read by said second light beam from one of said first and second optical head means, and means for causing said first light beam from one of said first and second optical head means to rewrite the same information signal as that written in said one sector in at least one alternate sector provided at a predetermined location on the record track containing said one sector when it is determined by said means for determining that the information signal is not written properly in said one sector.

* * * * *